March 4, 1941.   O. E. BARTHEL ET AL   2,233,468
VARIABLE PITCH PROPELLER
Filed July 7, 1938    3 Sheets-Sheet 1
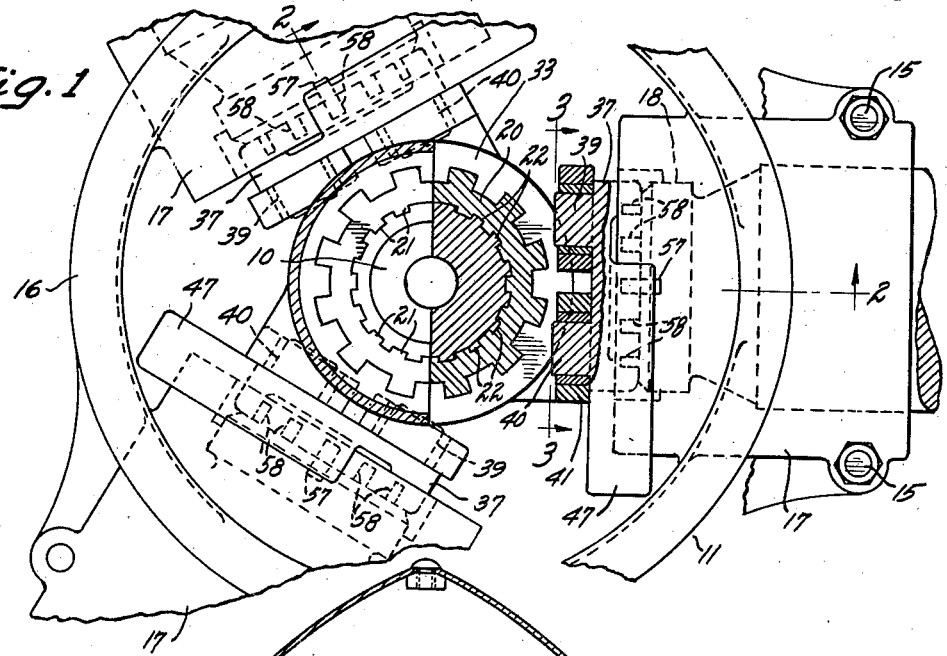
Fig. 1
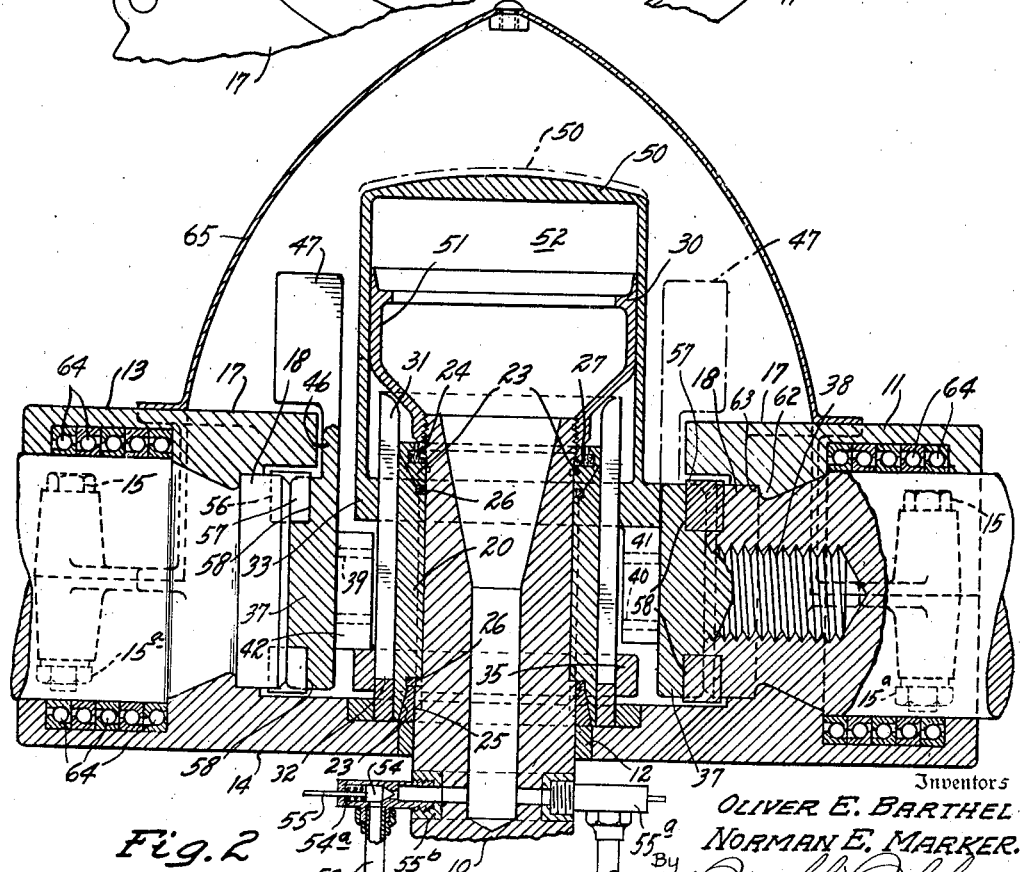
Fig. 2
Inventors
OLIVER E. BARTHEL
NORMAN E. MARKER
By 
Attorneys March 4, 1941.   O. E. BARTHEL ET AL   2,233,468
VARIABLE PITCH PROPELLER
Filed July 7, 1938   3 Sheets-Sheet 2
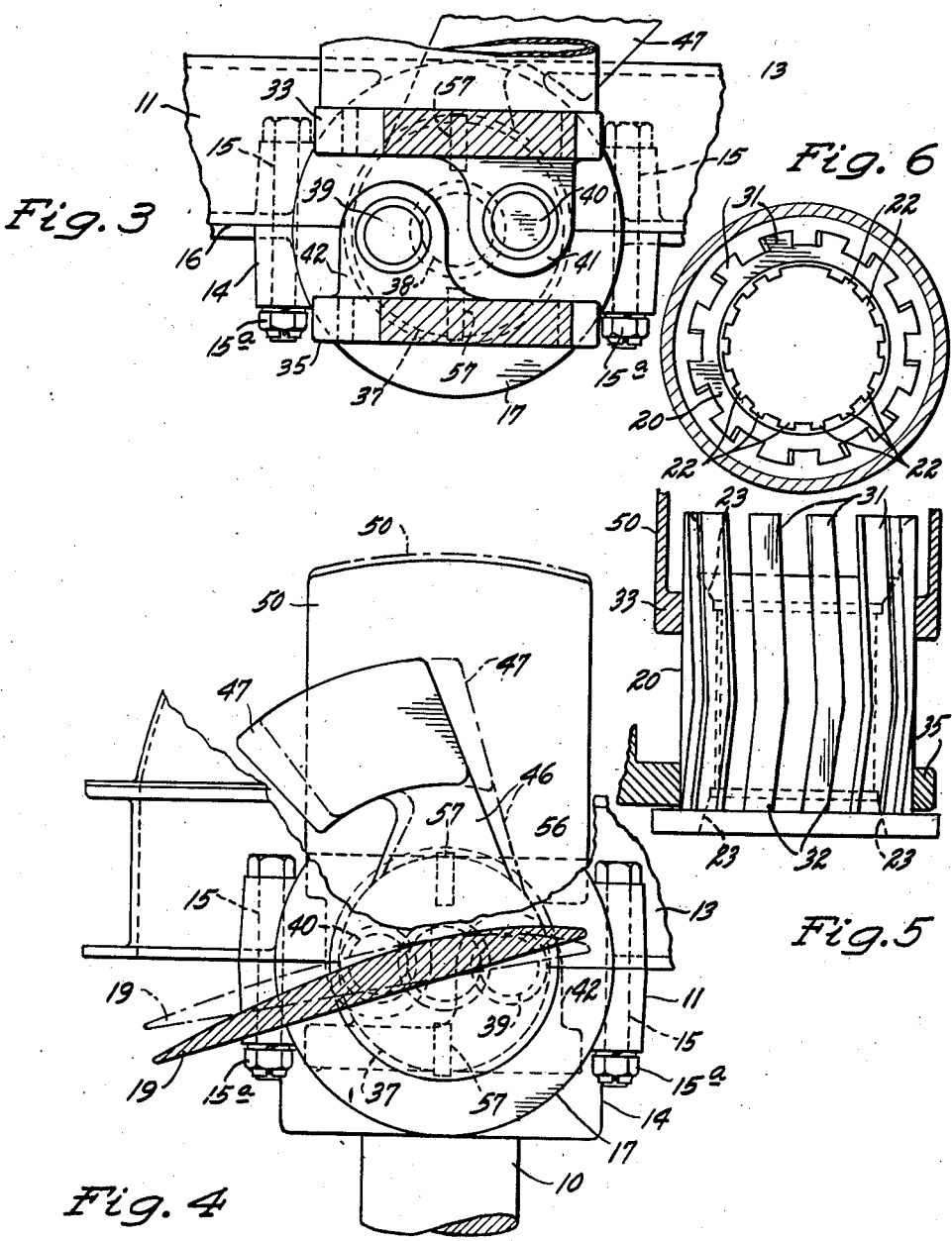
Inventors
OLIVER E. BARTHEL +
NORMAN E. MARKER.
Attorneys.

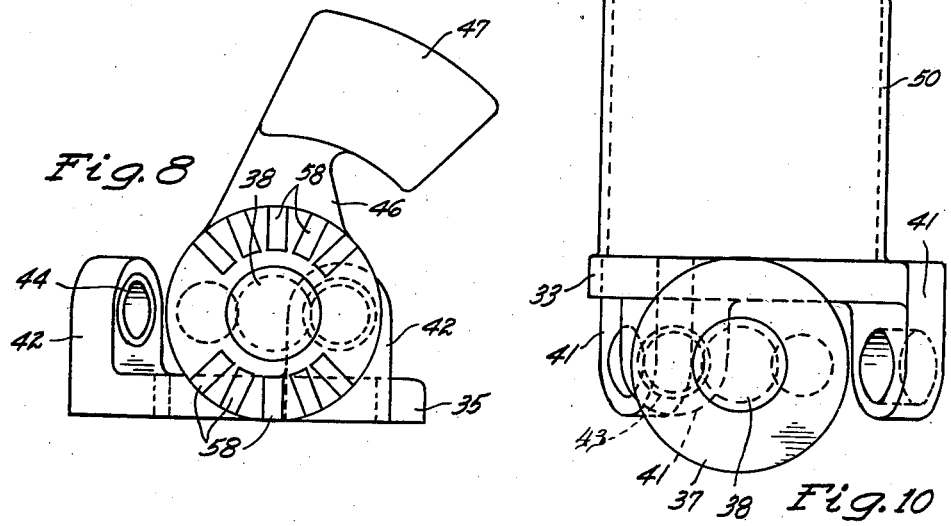
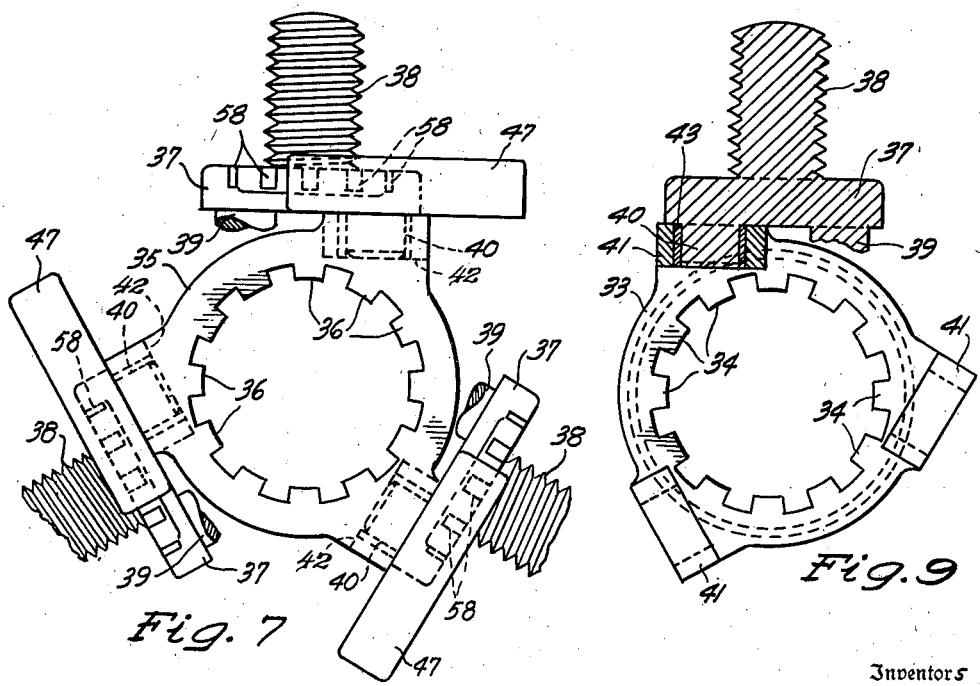

Patented Mar. 4, 1941

2,233,468

UNITED STATES PATENT OFFICE 2,233,468

VARIABLE PITCH PROPELLER

Oliver E. Barthel and Norman E. Marker, Detroit, Mich.

Application July 7, 1938, Serial No. 217,927

11 Claims. (Cl. 170—163)

This invention relates generally to aircraft propellers and more particularly to controllable, variable pitch propellers.

Aircraft propellers, the pitch of which can be adjusted at will by the aircraft operator during operation of the aircraft are desirable because a relatively low pitch propeller angle has been found to give high efficiency for quick take-off and climbing while a relatively high pitch propeller angle gives best results for high speed and high altitude flying. However, propellers of this character have, in the past, been complicated and bulky structures, expensive to manufacture and difficult to assemble.

Accordingly, it is an object of the present invention to provide a new and improved pitch controllable type of aircraft propeller which is compact, relatively inexpensive to manufacture and easily assembled.

Another object of the invention is to provide a propeller of the above mentioned character having a minimum of operating parts.

Another object of the invention is to provide a durable aircraft propeller and one having its blades anchored in a new and improved manner.

Other objects and advantages of the invention will become apparent from the following drawings which form a part of this specification and in which:

Figure 1 is a front view partly broken away and partly in section of a propeller and associated structure embodying the present invention;

Fig. 2 is a view shown in section of the propeller taken along the line and in the direction of the arrows 2—2 of Fig. 1;

Fig. 3 is an end view of one of the propellers taken along the line and in the direction of the arrows 3—3 of Fig. 1;

Fig. 4 is a side view of the propeller structure showing one of the blades in cross section and illustrating the pitch adjustment of the blades;

Fig. 5 is a detail view of parts of the propeller structure;

Fig. 6 is an end view of the detail view of Fig. 5;

Fig. 7 is a view shown in elevation of a collar of the propeller and associated parts;

Fig. 8 is an end view of the collar of Fig. 7;

Fig. 9 is a view shown in elevation of another collar of the propeller, and

Fig. 10 is an end view of the collar and associated parts of Fig. 9.

Referring to the drawings by characters of reference, the numeral 10 designates a hollow aircraft engine shaft on which is mounted a support or propeller hub 11 which, adjacent its rear end, is spaced from the shaft by a collar 12 on the shaft. The hub 11 is preferably a symmetrical hub constructed in two halves comprising a front half 13 and a rear half 14 which may be rigidly secured together by bolts 15 and nuts 15a or by other suitable means. The hub 11 includes a ring portion 16 having radially spaced, hollow bosses 17 formed in part by each of the hub halves and in each of the hollow bosses is received the enlarged butt or root end 18 of a propeller blade 19.

Within the hub, an elongated sleeve 20 is provided on the shaft 10 for rotation therewith, the sleeve being provided with internal splines 21 cooperable with external splines 22 provided on the shaft. Opposite, internal end portions of the sleeve 20 flare outwardly, as at 23, to receive front and rear centering cones 24 and 25, respectively, which are held in position by snap rings 26, and the front centering cone 24 has an annular outwardly facing recess 27 in its outer end to receive packing which is held under compression by an open ended tubular guide and extension member 30 threaded onto the outer end of the shaft, the member 30 together with the centering cones and snap rings, holding the sleeve 20 against movement axially of the shaft.

The sleeve 20 is provided with external, spiral, herringbone splines extending longitudinally thereof, one or the front end portion of the sleeve having right hand spiral splines, as at 31, and the other or rear end portion of the sleeve having left hand spiral splines 32, Fig. 5. To this end a pair of sleeves one having right hand external spiral splines and the other having left hand external spiral splines may be butt-welded end to end and arranged such that the abutting ends substantially align with or will be in substantially the same plane as the longitudinal axes of the blades 19. A collar 33 on the sleeve 20, adjacent the front end thereof is provided with internal splines 34 cooperable with the right hand sleeve splines 31 to rotate with the sleeve and also to move or slide axially on the sleeve. A second collar 35, similar to collar 33 is provided on the sleeve 20, adjacent the rear end thereof, and is provided with internal splines 36 cooperable with the left hand sleeve splines 32 to rotate with the sleeve and also to move or slide axially on the sleeve.

The propeller blades 19 are mounted for rotation in the hub bosses 17 transverse to the engine shaft 10 in order to vary the blade pitch for different flying conditions and rigidly secured on to each of the terminal butt ends 18 of the blades are discs or plate members 37 each of which may have an outwardly extending integral screw 38 screwthreaded into respective blades, each plate 37 also being provided with a pair of diametrically spaced, inwardly directed double crank pins or trunnions 39 and 40 providing double cranks for rotating the blades about their longitudinal axes. The front collar 33 is provided with radially spaced ears or bosses 41 extending rearwardly therefrom longitudinally of the sleeve 20, and similarly the rear collar 35 is provided with radially spaced bosses or ears 42 extending longitudinally of the sleeve 20 toward collar 33 the bosses 41 and 42 being interposed with respect to each other. The bosses 41 and 42 are apertured and are preferably provided with bushings 43 and 44 respectively, to receive one of the cranks or pins 39, 40. Of each pair of crank pins 39, 40 of each blade one of each pair is pivotally received in a bushing 43 of the front collar 33 and the other crank pin is pivotally received in a bushing 44 of the other or rear collar 35. The collars 33 and 35 are movable toward and away from each other axially on the drive shaft 10 causing the double cranks 39 and 40 to rotate the blades about their respective longitudinal axes thereby changing the pitch of the blades. The plates 37, which are secured to the butt ends 18 of the propeller blades 19, are each provided with an integral arm 46 which projects externally of the hub 11 at the front thereof and on the outer end of each arm is a counterweight 47 which, by centrifugal force, acts and on account of the operation of the propeller causes rotation of the blades about their longitudinal axes and changes the pitch of the blades to high pitch position.

A container or cylinder 50, having its outer end closed is integral with the outer collar 33 and receives the enlarged outer end portion 51 of the tubular guide 30 on which the cylinder 50 is slidable and axially reciprocal and with which it cooperates to provide an expansible pressure chamber 52 in communication with the hollow engine shaft 10. The inner or open end of the cylinder 50 fits over the sleeve 20 in spaced relation thereto and may be secured and sealed to the outer face of the outer collar 33 by welding the parts together. A fluid pressure line 53 which may lead from the engine oil line or pump (not shown) is connected to the hollow shaft 10 for the supply of oil to the expansible chamber 52 to move the cylinder 50 outward against the action of the counterweights 47. The oil line 53 may be controlled by a manually operable valve 54, of any suitable well known type which may be biased toward closed position by a spring 54a and the valve may be connected by a wire 55 to a manual control (not shown) which may be located at a point convenient for operation. A second valve 55a may be provided for permitting the oil in chamber 52 to drain back into the engine crankcase to thereby relieve the pressure and permit the counterweights 47 to become effective and this valve may also be any suitable type of manually operated valve. The valves 54 and 54a may be secured in and to a ring or collar 55b surrounding the shaft 10, the collar being provided with passages connecting the valves and the interior of the hollow shaft which rotates relative to the collar.

In the butt end 18 of each of the blades 19 is provided a pair of diametrically opposite slots 56 to receive keys 57 which may engage in a pair of a plurality of diametrically opposite slots 58 provided in the outer face of each of the plates 37 to thereby adjustably lock the blades and their plates together. It will be seen that any pair of the diametrically opposite slots 58 in the plates 37 may be aligned with the pair 56 of the blades 19 and the parts locked together by the keys 57 to change the range of pitch variation of the blades. Or in other words, the slots and keys provide for raising and lowering together, the high and low pitch limits of the blades.

Each of the tubular bosses 17 is provided with an internal inwardly facing shoulder 62 for abutment with an external outwardly facing shoulder 63 on the blades to anchor the blades to the hub and in each of the hub bosses 17 is provided a plurality of bearings 64 to reduce friction between the blades and the bosses on rotative adjustment of the blades about their longitudinal axes relative to the hub. The cylinder 50 may be enclosed by a casing 65 which may be rigidly secured to the hub 11, by any suitable means.

When the herein described propeller is in operation and the manually operable valve is opened by the operator to permit oil to enter the expansible pressure chamber 52, the pressure of the oil will overcome the counterweights 47 and move the cylinder 50 and front collar 33 outwardly and axially of the sleeve 20, rotating the blades 19, by means of the double crank 39 and 40, to the established low pitch positions of the blades. As the rear collar 35 is operatively connected to the front collar, via the crank plates 37, it will be seen that the two collars move away from each other on movement of the blades to the low pitch limit. When it is desired to change the pitch of the blades from low pitch to high pitch, the operator opens the valve 55a which permits the oil to drain out of the expansible chamber 52 thereby releasing the pressure therein and permitting the counterweights 47 to become effective and their centrifugal force moves the rear collar 35 formed axially on the sleeve 20 which causes the collars 33 and 35 to move toward each other rotating the blades 19 through the double cranks 39 and 40 to high pitch position. As previously mentioned, if a different pitch range is desired, the keys 57 are removed and the crank plate and blades then turned on their longitudinal axes to the new desired location aligning the proper slots 58 with the adjacent pair of slots in each blade after which the keys 57 are inserted to lock the plates to their respective blades.

What we claim is:

1. In a propeller structure for an engine having a drive shaft, a plurality of propeller blades rotatable by said shaft and also rotatable about their longitudinal axes relative and transverse to the axis of rotation of the shaft, a collar on the shaft to rotate therewith and also slidable along the shaft, said collar being pivotally connected to said blades off center of their longitudinal axes to rotate said blades in one direction about their longitudinal axes upon sliding movement of said collar on the shaft, means carried by said collar and operable during operation of the propeller to slide said collar along the shaft, a second collar on the shaft to rotate therewith and arranged to slide axially along the shaft, said second-named collar being pivotally connected to said blades off center of their longitudinal axes, said second named collar on sliding movement on the shaft rotating said blades about their longitudinal axes in directions opposite to said one direction and means carried by said second-named collar operable to overcome said first-named operating means and slide said second-named collar on the shaft.

2. In a propeller structure for an engine having a drive shaft, a plurality of propeller blades rotatable by said shaft and also rotatable about their longitudinal axes relative and transverse to the axis of rotation of the shaft, a collar on the shaft to rotate therewith and also slidable along the shaft, said collar being pivotally connected to said blades offcenter of their longitudinal axes to rotate said blades in one direction about their longitudinal axes on sliding movement of said collar on the shaft, means carried by said collar and operable during operation of the propeller to slide said collar along the shaft, a second collar on the shaft to rotate therewith and arranged to slide axially along the shaft, said second-named collar being pivotally connected to said blades offcenter of their longitudinal axes, said second named collar on sliding movement on the shaft rotating said blades about their longitudinal axes in directions opposite to said one direction, means carried by said second-named collar operable to overcome said first-named operating means and slide said second named collar on the shaft, and manually operable means to control said last named operating means.

3. In a propeller structure for an engine having a drive shaft, a collar on the shaft to rotate therewith and to slide axially thereon, a second collar on the shaft to rotate therewith and to slide axially thereon, a plurality of discs arranged to rotate with and about the axis of the shaft and also arranged to rotate about the axes transverse to the axis of rotation of the shaft, each of said discs having a pair of cranks, one of said cranks of each disc being operatively connected to one of said collars and the other of said cranks of each disc being operatively connected to the other of said collars, said collars on sliding on the shaft moving toward and away from each other, propeller blades mounted one on each of said rotatable discs for rotation therewith, means operable to move said collars toward each other to rotate the discs in one direction to change the pitch of the blades, and means operable to move said collars away from each other to rotate said discs in the opposite direction.

4. In a propeller structure for an engine having a drive shaft, a collar on the shaft to rotate therewith and to slide axially thereon, a second collar on the shaft to rotate therewith and to slide axially thereon, a plurality of discs arranged to rotate with and about the axis of the shaft and also arranged to rotate about axes transverse to the axis of rotation of the shaft, each of said discs having a pair of cranks, one of said cranks of each disc being operatively connected to one of said collars and the other of said cranks of each disc being operatively connected to the other of said collars, said collars on sliding on the shaft moving toward and away from each other, propeller blades mounted one on each of said rotatable discs for rotation therewith, means operable to move said collars toward each other to rotate the discs in one direction to change the pitch of the blades, and means operable to move said collars away from each other to rotate said discs in the opposite direction, said blades being rotatable relative to and about the axes of rotation of said blades to select desired high and low propeller pitch range, and means to hold said blades against movement relative to said discs.

5. In a propeller structure for an engine having a drive shaft, a plurality of radially spaced propeller blades having butt ends disposed toward the shaft transverse thereto, said propeller blades at their butt ends having crank means and being rotatable about the axis of the shaft, said propeller blades also being rotatable about their longitudinal axes for adjusting the pitch of the blades, a pair of shiftable members operatively connected to said cranks and mounted on the shaft for sliding movement toward and away from each other to rotate said blades in opposite directions about their respective longitudinal axes, means carried by and operable to move said shiftable members toward each other, and means carried by and operable to move said shiftable members away from each other.

6. In a propeller structure for an engine having a drive shaft therefor, sleeve means on said shaft to rotate therewith and having external right and left hand spiral splines, a collar on said sleeve and having internal spiral splines cooperable with said left hand spiral spline, said collar being rotatable with said shaft and also being axially slidable thereon, a second collar on said sleeve and having internal spiral splines cooperable with said right hand spiral splines of said sleeve, said second-named collar being rotatable with the shaft and also being slidable axially thereon, means for sliding said collars toward each other, means for sliding said collars away from each other, a plurality of radially spaced propeller blades rotatable about the axes of the shaft, each of said blades also being arranged to rotate about its respective longitudinal axis to change the pitch of the blades and means operatively connecting said collars and said blades.

7. In a propeller structure for an engine having a drive shaft therefor, a rotatable hub surrounding the shaft in spaced relation thereto, a plurality of propeller blades having terminal butt ends attached to said hub for rotation therewith and also being arranged to rotate about their respective longitudinal axes relative to the hub to vary the pitch of the blades, crank means carried by and operable to rotate said blades, sleeve means on the shaft for rotation thereby and having right and left hand spiral splines, a collar on said sleeve having internal splines cooperable with said right hand splines to rotate with said sleeve and also to slide axially on said sleeve, a second collar on said sleeve and cooperable with the left-hand splines to rotate with the sleeve and to slide therealong, said collar being operatively connected to said crank means to turn said blades about their longitudinal axis upon sliding of the collar in one direction on said sleeve, said second named collar being operatively connected to said crank means and on sliding in one direction rotating said blades in a direction opposite to said first-named direction, means operable to slide said collars toward each other on said sleeve and means operable to slide said collars away from each other.

8. In a propeller structure for an engine having a propeller shaft, a hub member surrounding and spaced from said shaft, a sleeve member on and rotatable with the shaft within said hub, said sleeve member having an external right hand spiral spline adjacent one end thereof, and an external left hand spiral spline adjacent the other end thereof, a plurality of radially spaced propeller blades having butt end portions mounted in said hub for rotation therewith and for rotation about their respective longitudinal axes relative to said hub, bearings in said hub for each of said blades, said blades at their terminal butt ends each having a pair of spaced crank pins offcenter of the longitudinal axes of said blades, a collar having an internal spline cooperable with one of said splines, said collar being rotatable with said sleeve and also being slidable longitudinally thereof, said collar being pivotally connected to one of each of said pairs of crank pins to rotate the blades about their respective axes in one direction, counterweights carried by and operable to move said collar longitudinally of said sleeve in a direction to rotate said blades in said one direction, a second collar having an internal spline cooperable with the other of said sleeve splines to rotate with said sleeve and to also move longitudinally thereof, said second-named collar being pivotally connected to the other of said crank pin and on longitudinal movement in one direction rotating said blades in a direction opposite from said first-named direction of rotation of said blades, an expansible fluid chamber carried by said second-named collars and communicative with a source of fluid pressure, said second-named collar being longitudinally movable on expansion of said chamber, and means to control expansion of said chamber.

9. In a propeller structure for an engine having a drive shaft, a plurality of propeller blades radially spaced about the axis of rotation of the shaft, a shiftable member mounted on the shaft for rotation therewith and shiftable along the shaft, crank means on the inner ends of the blades and operatively connected to said shiftable member to turn said blades about their longitudinal axes in predetermined directions upon shifting of said member along the shaft in one direction, means carried by and operable to shift said member along said shaft in said one direction, a second shiftable member mounted on said shaft for rotation therewith and shiftable along said shaft, crank means on the inner ends of said blades and operatively connected to said second-named shiftable member to turn said blades about their longitudinal axes in opposite directions to said predetermined directions upon shifting of said second-named shiftable member in a direction opposite to said one direction, and means carried by said second-named shiftable member and operable to overcome said first-named shifting means.

10. In a propeller structure for an engine having a drive shaft, a plurality of propeller blades radially spaced about the axis of rotation of the shaft, a shiftable member mounted on the shaft for rotation therewith and shiftable along the shaft, crank means on the inner ends of the blades and operatively connected to said shiftable member to turn said blades about their longitudinal axes in predetermined directions upon shifting of said member along the shaft in one direction, means carried by and operable to shift said member along said shaft in said one direction, a second shiftable member mounted on said shaft for rotation therewith and shiftable along said shaft, crank means on the inner ends of said blades and operatively connected to said second-named shiftable member to turn said blades about their longitudinal axes in opposite directions to said predetermined directions upon shifting of said second-named shiftable member in a direction opposite to said one direction, means carried by said second-named shiftable member and operable to overcome said first-named shifting means, and means operable to control said last-named means.

11. In a propeller structure for an engine having a drive shaft, a hub surrounding the drive shaft and loosely mounted thereon, said hub having a plurality of radially spaced openings provided internally with outwardly facing sockets, a plurality of propeller blades having root ends extending through respective openings in said hub and seating in said sockets to limit inward movement of said blades, a crank member secured to the inner end of each of said blades, a shiftable member longitudinally slidable on said shaft and rotatable therewith, a second shiftable member rotatable with the shaft and longitudinally slidably mounted thereon, a second crank member secured to the inner end of each of said blades and connected to said second-named shiftable member, said shiftable members being movable toward each other to turn the blades about their longitudinal axes in one direction and being movable away from each other to turn the blades about their longitudinal axes in the opposite direction, means operable to move said shiftable members toward each other, and means operable to move said shiftable members away from each other.

OLIVER E. BARTHEL.
NORMAN E. MARKER.